May 20, 1969  H. WAASKE  3,444,796
PHOTOGRAPHIC CAMERA
Filed June 14, 1966

United States Patent Office 3,444,796
Patented May 20, 1969

3,444,796
PHOTOGRAPHIC CAMERA
Heinz Waaske, Braunschweig-Runingen, Germany, assignor to Rollei-Werke Franke & Heidecke, Braunschweig, Germany, a German firm
Filed June 14, 1966, Ser. No. 557,495
Claims priority, application Germany, June 16, 1965, R 40,885
Int. Cl. G03b 19/04
U.S. Cl. 95—31                     2 Claims

ABSTRACT OF THE DISCLOSURE

A roll film camera in which film is advanced from a cassette through an exposure area to a metering drum with sprocket teeth engaging perforations in the film, and then onto a take-up spool located partly in front of the metering drum. The film is rewound into the cassette, and during the rewinding the film tends to form a curved loop between the take-up spool and the drum. The flanks of the sprocket teeth which face toward the exposure area, are formed of involute shape. The opposite flanks, are formed substantially in the shape of portions of a hypocycloid generated by circles having respectively the radius of the metering drum and the radius of the loop of film between the take-up spool and the metering drum during the rewinding operation.

---

This invention relates to a photographic camera, and more particularly to a camera of the type employing roll film having perforations along one or both edges of the film. Familiar types of such cameras customarily use 35 mm. film perforated along both edges, the film being withdrawn from a cassette, advanced across the exposure area or exposure frame, then engaging with a metering pinion or drum which has teeth extending into the perforations of the film, and finally being wound up on a take-up spool located beyond the metering pinion or drum. When the exposures have been completed, the film is usually rewound back into the cassette, and the cassette is removed from the camera and sent to the establishment which is to do the processing of the exposed film.

An object of the invention is the provision of a generally improved and more satisfactory camera of this kind.

Another object is the provision of a camera having smaller dimensions or a more compact size than previous cameras of the same general type.

Still another object is the provision of a camera having the take-up spool so located with respect to other parts of the camera, that the length of the camera body may be made substantially shorter than has heretofore been customary.

A further object is the provision of a camera of this type, having an improved form of teeth on the metering sprocket or drum.

Figure 1:
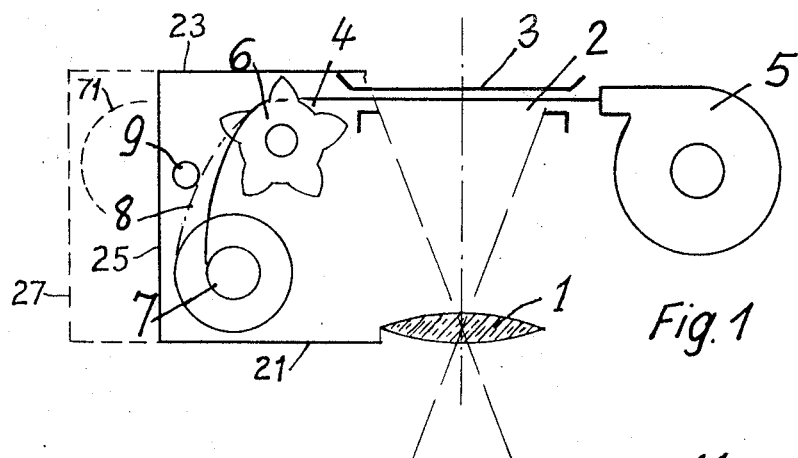
Figure 2:
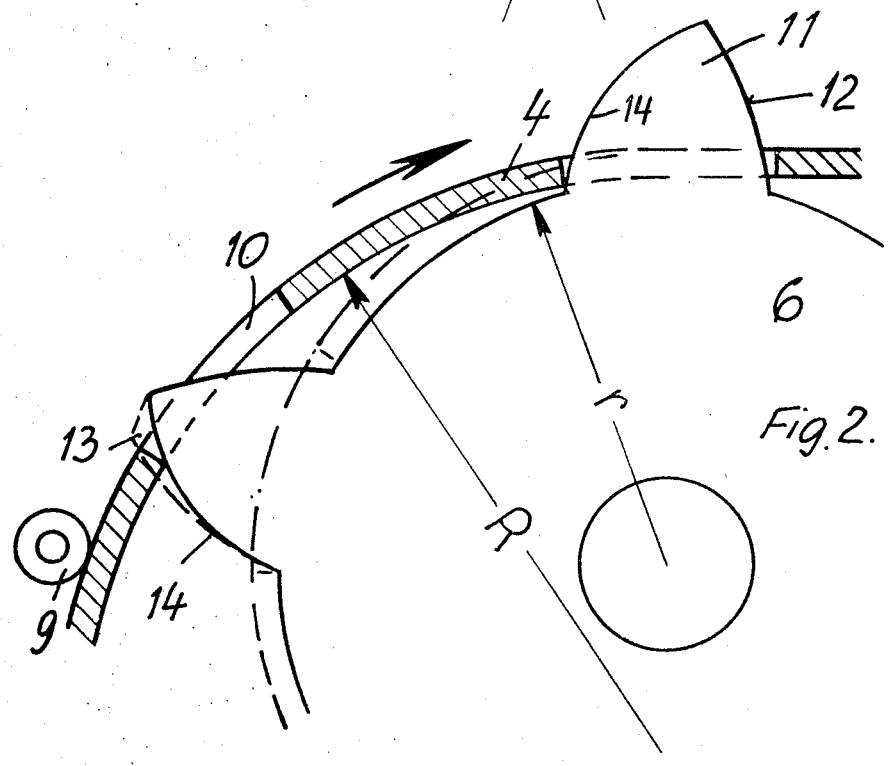

These and other desirable objects may be attained in the manner disclosed as an illustrative embodiment of the invention in the following description and in the accompanying drawings forming a part hereof, in which:

FIG. 1 is a schematic view showing the basic outline and arrangement of parts of a camera in accordance with the present invention; and FIG. 2 is a fragmentary view of the sprocket drum and a piece of film, on an enlarged scale, illustrating the improved shape of sprocket teeth on the drum.

Referring first to FIG. 1, the camera comprises the usual conventional lens or objective schematically shown at 1, and an image aperture plate providing an exposure aperture 2, associated with a backing plate or presser plate 3 resiliently pressed forwardly toward the aperture 2 in the usual conventional manner. The film 4 is drawn from the conventional film cassette 5, and passes through the guide formed between the parts 2 and 3, to a metering drum or sprocket 6, approaching this drum in a tangential direction as illustrated.

In conventional cameras of this general kind or type, the film customarily continues straight ahead, in substantially a straight line to a take-up spool partially shown in broken lines at 71. When the camera has this conventional construction, with no significant change in direction of the film as it passes the metering drum 6, the camera body must have considerable length in order to encompass the cassette 5 at one end of the camera body and the take-up spool 71 at the opposite end.

As distinguished from this convential construction, the camera according to the present invention places the take-up spool at the location shown in full lines at 7, instead of the conventional location shown in broken lines at 71. The take-up spool 7, according to the present invention, is placed substantially farther forwardly than the metering drum 6, closer to the front wall of the camera, and inwardly toward the optical axis, as clearly seen in FIG. 1. In this location, the film 4, as it passes the metering drum 6, bends partially around the drum, as illustrated, instead of extending straight past the drum.

This new location of the take-up spool 7 enables a considerable reduction in the length of the camera body. The front wall, partially indicated schematically at 21, and the rear wall, partially indicated schematically at 23, need be extended only as far as the end wall 25 which adequately encompasses the take-up spool 7. Of course the walls are appropriately hinged to open up in order to obtain adequate access to the take-up spool 7, to thread the end of a new film onto the spool. It is seen that if the take-up spool were in the conventional location 71 instead of the new location 7, the end wall of the camera would have to be at some such position as shown in broken lines at 27, with the result that the camera body would be considerably longer.

When the film is being advanced from one exposure position to the next exposure position, by rotary motion imparted to the take-up spool 7 by conventional spool drive means, the drag or resistance to motion of the film causes the film to hug rather closely around the periphery of the metering drum 6 and to extend in an almost straight line, but with slight curvature, tangentially from the drum 6 to the take-up spool 7, approximately in the shape shown in full lines in FIG. 1. During the rewinding operation, however, when rotary motion is imparted to the spool in the cassette 5 in order to draw the film back into the cassette, the spool 7 offers very little resistance or drag and so the film is not drawn back so tightly, but tends to curve out to make a loop such as shown in broken lines at 8. In order to limit the size of this loop and prevent it from becoming excessively large during the rewinding operation, it is preferable to provide a limiting guide roller 9 positioned as illustrated in FIG. 1.

Reference is now made to FIG. 2, which shows certain parts on an enlarged or exaggerated scale. The film 4 has perforations 10, into which are engaged the teeth 11 of the sprocket drum or metering drum 6, so that as the film is fed forward, the engagement of the sprocket holes in the film with the teeth on the drum causes rotation of the drum in accurate synchronism with the feeding of the film. Through conventional metering mechanism well understood in the art, the details of which are not important to the present invention, the rotation of the drum controls metering mechanism which stops the advancing rotation of the take-up spool 7 when a sufficient length of film has been fed, for the next exposure. The subsequent operation of the camera shutter serves in the conventional way to unlock the metering mechanism for a new cycle of operation, so that the film can be advanced again through the required metered length, ready for the next exposure.

During the rewinding operation after the exposures have been completed, the film 4 runs off of the metering drum 6 in a tangential direction, to the image aperture 2 and onward to the cassette 5. Hence the flanks 12 of the teeth 11 are given an involute form or shape. However, if the opposite flanks or sides of the teeth 11 are given the same involute shape, this will produce undesirable disturbances in the forward winding direction, as can be seen from the left hand part of FIG. 2, where an involute form of the left hand edge of a tooth is shown in broken lines at 13. It will be seen that this shape interferes with the adjacent end of the sprocket hole 10 in the film 4. Therefore, the left flanks of the teeth 11 are not given the involute shape, but on the contrary are given the hypocycloid shape illustrated in full lines at 14. This hypocycloid shape has as its basis the maximum radius R of the film loop, this maximum radius being controlled by the guide roller 9.

It is apparent that this form or shape of tooth on the drum 6 is effective to prevent damage to the sprocket holes of the film, during motion of the film in either direction, and regardless of whether the film is positively pulled forwardly by the action of the take-up spool 7 and simply causes the metering drum 6 to turn from the advancing motion of the film, or whether it is the drum 6 which is driven and positively pulls the film forwardly, the take-up spool 7 having a friction drive which simply takes up the slack of the film advanced by the rotation of the drum 6. Because the hypocycloid shape of the tooth flank 14 is produced from the radius R of the film loop and the radius r of the sprocket drum, it is effective to operate upon the film without damage, in either situation, when rotation of the drum drives the film or when motion of the film drives the drum.

It is seen from the foregoing disclosure that the objects and purposes of the invention are well fulfilled.

It is to be understood that the disclosure is given by way of illustrative example only, rather than by way of limitation, and that without departing from the invention, the details may be varied within the scope of the appended claims.

What is claimed is:

1. A photographic camera of the type in which perforated film is advanced from a supply cassette past an exposure aperture to a metering drum having sprocket teeth engaging perforations in the film and thence to a take-up spool, and in which the film after exposure is rewound into the cassette, characterized by the fact that said take-up spool is located farther forwardly than and partly in front of said drum, the film during rewinding tending to form a large curved loop between said take-up spool and said drum, and further characterized by the fact that those flanks of said sprocket teeth which are faced toward said exposure aperture while engaged in the perforations of said film are formed substantially of involute shape and those flanks of said teeth which are faced toward said take-up spool are formed substantially in the shape of portions of a hypocycloid generated by circles having respectively the radius of said metering drum and the radius of said curved loop of film.

2. A construction as defined in claim 1, further characterized by a guide roller limiting the size of said loop formed by the film between said take-up spool and said drum during rewinding.

References Cited

UNITED STATES PATENTS

| | | | |
|---|---|---|---|
| 2,086,315 | 7/1937 | Faas | 95—31 |
| 2,128,815 | 8/1938 | Guest | 74—462 |
| 2,147,106 | 2/1939 | Nuchterlein | 95—31 |
| 2,306,854 | 12/1942 | Zimmer | 74—462 |
| 2,403,492 | 7/1946 | Boor | 74—462 |

NORTON ANSHER, *Primary Examiner.*

R. A. SCHROEDER, *Assistant Examiner.*